UNITED STATES PATENT OFFICE.

ANTONY DE CICILIANI, OF LOS ANGELES, CALIFORNIA.

WATERPROOFING COMPOSITION AND PROCESS OF MAKING SAME.

1,390,236.　　　　　Specification of Letters Patent.　　Patented Sept. 6, 1921.

No Drawing.　　Application filed January 24, 1921. Serial No. 439,663.

*To all whom it may concern:*

Be it known that I, ANTONY DE CICILIANI, a citizen of Jugoslavia, residing at Los Angeles, in the county of Los Angeles and State of California, have invented a new and useful Waterproofing Composition and Process of Making Same, of which the following is a specification.

This invention relates to matter used for waterproofing other articles and to processes for making such matter.

One of the objects of this invention is to provide a paste or composition of substances, ready for use, only to be diluted by water up to eventually one hundred parts of water to one part of this matter, the matter to be kept in a suitable container airtight so as to maintain its faculty.

Another object is to provide such matter to be used for waterproofing concrete walls, cement floors, concrete matter in general, brick walls, stucco, masonry, and any other similar article that is in a similar manner subject to decay.

Another object is to provide a waterproof that can be used as a coating.

Other objects will appear from the following description and appended claims.

Masonry, wood, steel and other similar articles must be protected by suitable coating to keep them in their original state and soundness. Paint and other similar matter is however not always sufficient to protect properly.

It is especially desired to have a substance or composition of substances to form a particularly hard surface when applied.

When this matter is applied to any particular article, it tends to keep such article unimpaired by reason of its special hardness and by its waterproofing action.

The matter is preferably compounded in paste form, and so kept until it is to be used, when it is diluted by water up to one hundred parts of water to one part of this matter. The different ingredients may be varied to some extent without departing from the principle of this invention, but the best results are obtained by compounding in the following manner the following ingredients: Heating and liquefying soap, and adding and mixing to such liquefied matter, calcium chlorid, potassium alum and hydrated lime in powdered form. This mixture is kept in its damp state so as to readily take and mix with water, the mixture being naturally too rich to be used in such a state, and as long as the mixture is in a damp state it takes water readily.

The proportions of the different ingredients may naturally also be varied without materially changing the effects of the matter. The best results are, however, obtained by using 2% of calcium chlorid, 44% of castile soap, 44% of potassium alum, and 10% of hydrated lime in powdered form.

While heating and liquefying the soap, water may be added to the extent of about 30%.

The mixing of the several ingredients with the liquefied soap is preferably accomplished after the soap is cooled off, and the volume of the liquefied soap is then naturally taken as the base in computing the amount of the other ingredients to go with the mass of liquefied soap, as will easily be understood.

When ready to use the matter for waterproofing, a suitable amount of the mixture is diluted with water up to eventually one to a hundred parts of water, and this thin matter is used as a coating on the articles to be treated for waterproofing.

For making concrete articles waterproof, the matter may be added to the concrete mixture before the concrete is formed into any article, or applied as a coating after such concrete articles have been finished, without material difference to the concrete or to the waterproofing.

In diluting the paste-like matter with water it is naturally also immaterial to what extent the matter is diluted, depending entirely on the desired strength. The matter as preferably compounded is in proper proportion as far as the different ingredients are concerned and adding water weakens the matter to such extent.

Having thus described my invention, I claim:

1. In the manufacture of waterproof material, the process of dissolving and heating castile soap in water and then adding calcium chlorid, potassium alum and hydrated lime in powdered form to a paste-like mass to be diluted with water at the time when it is to be used for coating.

2. In the manufacture of waterproof material, the process of dissolving and heating castile soap in water and then after cooling the liquefied soap adding calcium chlorid, potassium alum and hydrated lime in powdered form to bring the whole to a paste-like mass to be kept in this damp state for the time when it is to be used.

3. In the manufacture of waterproof material, the process of dissolving and heating castile soap in three times its own amount of water, letting this liquefied soap cool, then adding calcium chlorid, potassium alum and hydrated lime in powdered form to bring the whole to a paste-like mass to be kept in this damp state for a time when it is to be used.

4. In the manufacture of waterproof material, the process of dissolving and heating castile soap in three times its own amount of water, letting this liquefied soap cool, and then adding 2% of calcium chlorid, 44% of potassium alum and 10% of hydrated lime in powdered form, taking the liquefied soap at the rate of 44%.

5. In a waterproof material, 2% of calcium chlorid, 44% of liquefied castile soap, 44% of potassium alum, and 10% of hydrated lime in powdered form.

6. In a waterproof material, 2% of calcium chlorid, 44% of liquefied soap, 44% of potassium alum, 10% of hydrated lime in powdered form, and up to hundred times the amount of the other ingredients of water added for diluting the material for coating.

In testimony that I claim the foregoing as my invention I have signed my name in the presence of two subscribing witnesses.

ANTONY DE CICILIANI.

Witnesses:
 OTTO H. KRUEGER,
 JESSIE A. MANOCK.